United States Patent Office 2,868,633
Patented Jan. 13, 1959

2,868,633

CONTROL OF GRASS GROWTH

Lyle D. Goodhue, Bartlesville, Okla., assignor to Phillips Petroleum Company, a corporation of Delaware No Drawing. Application March 12, 1956
Serial No. 570,692

26 Claims. (Cl. 71—2.3)

This invention relates to control of grass growth, especially Bermuda grass growth. In one of its aspects the invention relates to a herbicidal composition containing as one of its effective ingredients a sulfenamide compound. In another of its aspects, the invention relates to a herbicidal composition containing as one of its effective ingredients a thiosulfenamide compound. In still another of its aspects, the invention relates to a herbicidal composition which, in addition to a sulfenamide or thiosulfenamide compound, also contains certain other ingredients which are novel in respect of their inclusion in a herbicidal composition. In still another aspect, the invention relates to the use of novel compositions comprising selected sulfenamide or thiosulfenamide compounds as grass herbicides. In a further aspect, still, the invention relates to a method for control of Bermuda grass, etc.

In the field of agricultural chemicals, one of the more valuable contributions has been the use of herbicides as weed killers. The term "weed" is generally considered to include any plant which persists in growing where it is not wanted. A number of herbicidal compositions have either been proposed or used as weed killers, but, in general, most of them are undesirable for one reason or another. Industrial herbicides, generally, are employed when it is desired to kill, for example, all of the weeds growing on a particular plot of ground, but, in some instances, it is desirable to kill only one particular plant growing along the borders of cultivated plots, flower beds, and the like. One example of such a plant is Bermuda grass. While Bermuda grass is a desirable plant in a number of instances, for example, as lawn grass, it is quite often a pest in other instances especially where homeowners are plagued by Bermula grass encroaching upon flowerbeds.

An object of this invention is to provide an ingredient novel for the control of grasses, especially Bermuda grass. It is another object of this invention to provide a novel method for the control of grasses, especially Bermuda grass. Still another object of this invention is to provide a herbicidal composition containing an especially desirable adjuvant carrier for use as Bermuda grass herbicide. Other aspects, objects, as well as the several advantages of the invention are apparent from a study of the disclosure and the appended claims.

According to this invention, there are provided a method for controlling growth of grasses, especially Bermuda grass, and a herbicidal composition for said method containing as an effective ingredient thereof a sulfenamide or thiosulfenamide compound. The sulfenamide or thiosulfenamide compounds which can be used have the following structural characteristics:

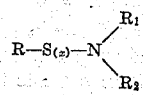

wherein $(x)$ represents an integar selected from the group of 1 and 2, R, $R_1$ and $R_2$ are one of an alkyl, aryl, alkaryl, aralkyl, and a cycloalkyl radial, wherein in said radical R, $R_1$ and $R_2$ each contain at least one and not more than 10 carbon atoms and are not necessarily identical, wherein $R_1$ and $R_2$ can, together with the nitrogen, form a heterocyclic ring. The radicals can be substituted with certain groups such as halogen, hydroxy, etc. However, unsubstituted radicals are preferred at the present time. The heterocyclic ring can contain oxygen. Thus, $R_1$ and $R_2$ can form a ring containing 5–6 atoms selected from the group consisting of carbon, oxygen and nitrogen. At least 3 atoms will be carbon atoms.

Typical compounds applicable to the present invention where $(x)$ is one include N,N-di-2-ethylhexyl-tert-butylsulfenamide, phenylsulfenylpiperidine and phenylsulfenylmorpholine. Typical compounds applicable to the present invention when $(x)$ is two include N,N-dimethylisopropylthiosulfenamide, N,N-di-tert-butyl-n-hexylthiosulfenamide, N-methyl-N-nonyl-isooctylthiosulfenamide, N-n-pentyl-N-n-decyl-n-decylthiosulfenamide, N,N-diethyl-tert-butylthiosulfenamide, N-phenyl-N-cyclohexyl-[2-butylphenyl]thiosulfenamide, N,N-ditolyl-benzylthiosulfenamide, n-decylthiosulfenylpiperidine, isooctylthiosulfenylmorpholine, N-2-chloroethyl-N-tert-butylthiosulfenamide, N,N-di-n-propyl-2-hydroxyethylthiosulfenamide, N,N-dimethyl-[2-bromo-n-butyl]sulfenamide, 4-chlorophenylthiosulfenylmorpholine and 2-hydroxyethylsulfenylpiperidine.

Especially presently preferred are compounds which have the following structural characteristics:

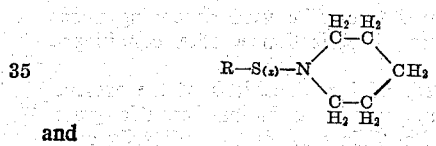

and

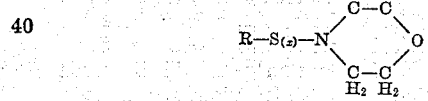

wherein $(x)$ represents an integer selected from the group of 1 and 2 and wherein R is selected as before. When $(x)$ is 1, R preferably will be phenyl, and when $(x)$ is 2, R preferably will be an alkyl radical, the R containing at least one and not more than 10 carbon atoms.

The compounds of the invention as well as methods for their preparation are known in the art. The sulfenamides can be prepared by reacting a sulfenyl halide with an amine in the presence of an aqueous solution of an alkaline material. The production of sulfenamides by this process is described and claimed in U. S. Patent No. 2,520,400, issued August 29, 1950, to Chester M. Himel and Lee O. Edmonds. The preparation of thiosulfenamides by reacting a thiosulfenyl halide with an amine in the presence of an aqueous solution of an alkaline material is described and claimed in U. S. Patent No. 2,520,401, issued August 29, 1950, to Chester M. Himel and Lee O. Edmonds.

The compounds mentioned herein are effective for the eradication of grasses when applied thereto in any suitable form such as solutions, powders, creams, aerosols, as pure compounds, whether in crystalline or liquid, or in emulsion form, or as sulfenamide or thiosulfenamide concentrates. I have found that it is convenient to dissolve a sulfenamide or thiosulfenamide compound of the types disclosed above in a herbicide adjuvant carrier or otherwise employ it in a suitable carrier and to apply the composition so formed. Adjuvants or carriers which I have found applicable to the present invention include those which are substantially inert with respect to the active herbicidal ingredient or at least do not adversely affect the desirable action thereof. The materials which have been found useful for this purpose include acyclic and alicyclic saturated hydrocarbons containing at least 5 carbon atoms such as n-pentane, n-hexane, octane, cyclohexane, kerosene, napthas, and the like. A preferred carrier is hydrofluoric acid heavy alkylate, an isoparaffinic hydrocarbon fraction boiling within the range of about 260° F. to about 800° F. In some instances, it may be desirable to employ an adjuvant medium or carrier which of itself displays a toxic effect on higher plant life and thus gain the benefit of the combined toxicity of both substances at a single application. Generally, the hydrocarbon carrier will have a boiling range of about 150° F.–800° F.

Solutions or dispersions prepred according to the manner of the present invention contain the sulfenamide or thiosulfenamide compounds on a weight basis of from 0.1 to 5.0 percent, preferably 0.5 to 2.0 percent. Compositions containing a compound of the present invention as a herbicidal ingredient may be applied for their intended purpose in several different ways. The most advantageous and presently preferred way, especially when treating large areas, is to spray a liquid composition on the leaves of the plants to be exterminated. The amount of herbicidal composition to be applied will be determined by the method of application. For example, when a liquid composition is sprayed on the plants, sufficient material should be applied to wet the plants with a minimum amount running from the leaves. The herbicidal compositions of this invention are particularly effective in the range of 10 to 200 pounds of herbicide per acre of Bermuda grass, for example. Somewhat lower or higher amounts can be used depending upon the nature of the area of application, weather conditions, etc.

As stated, the herbicidal compositions of the present invention are advantageously useful as Bermuda grass herbicides. While Bermuda grass is not ordinarily considered a weed, it is often considered a pest, for example, by encroaching upon flower beds, etc., a long the edges of lawns. The herbicidal compositions of the present invention can be used advantageously to kill Bermuda grass along the borders of cultivated plots, flower beds, and the like, or the compositions can be used to kill all of the weeds as well as Bermuda grass growing on a particular plot of land. The herbicidal compositions of the present invention can also be used to kill Bermuda grass on ground where seeds have been planted without damage to plants emerging from the planted seeds subsequent to treatment. Such a property distinguishes the action of my herbicides from that of, say, sodium chloride or similar materials known to have general herbicidal effects but which prevent growth of vegetation over long periods of time, sometimes for years, and qualifies my herbicides for use as preemergence herbicides.

As shown by Example II of the specific examples, different sulfenamides and thiosulfenamides of the general formula hereinbefore described exhibit different effects on seeds of plants other than Bermuda grass, which is one of the major advantages of the herbicides of the present invention. For example, after a crop is planted, a selected composition of the present invention can be used which does not affect the planted seeds when applied to the Bermuda grass growing in the field. Thus, the Bermuda grass can be killed and the planted crop will sprout undamaged and be able to achieve its maximum growth because the plants were not robbed of moisture, fertilizer and sunshine by the Bermuda grass. This procedure eliminates the labor that would be ordinarily required to weed out the Bermuda grass.

It is known that Bermuda grass is one of the hardest, if not the hardest, grass to control. Therefore, the invention is exemplified therewith.

The following examples are illustrative of my invention:

EXAMPLE I

Various sulfenamides and thiosulfenamides were tested for herbicidal activity toward Bermuda grass in the following manner. The compound to be tested was dissolved in HF heavy alkylate to form a solution containing 1 percent by weight of the sulfenamide or thiosulfenamide compound. If the compound to be tested was insoluble in the heavy alkylate, a small amount of acetone was used to dissolve the sulfenamide or thiosulfenamide. The heavy alkylate is not toxic to Bermuda grass but does enhance the toxicity of a chemical. Ten milliliters of the 1 percent solution of sulfenamide or thiosulfenamide compound were then applied to healthy plugs of Bermuda grass each growing in 4-inch clay flower pots. This corresponds to 100 pounds per acre of the herbicide. The plugs had been growing for two weeks to a month before they were used. The treated plugs were then checked at 3 days, one week, two weeks and 3 weeks. The results of these tests are expressed below in Table I.

*Table I*

| Compound | 3 days | 1 week | 2 weeks | 3 weeks |
|---|---|---|---|---|
| 1 | KT | KT | KT | NG |
| 2 | KT | KT | KT | NG |
| 3 | KT | KT | Sev. | Sl. G |
| 4 | Sev. | Sev. | Sev. | Sl. G |
| 5 | Mod. | Sev. | Sev. | Sl. G |
| 6 | KT | KT | KT | NG |
| Heavy HF Alkylate | GG | GG | GG | GG |

1. N,N-diethyl-tert-butylthiosulfenamide.
2. Phenylsulfenylmorpholine.
3. Tert-butylthiosulfenylpiperidine.
4. Phenylsulfenylpiperidine.
5. N,N-di-2-ethylhexyl-tert-butylsulfenamide.
6. Tert-butylthiosulfenylmorpholine.

Legend:
 KT—kill tops.
 Sev.—severe burn.
 Mod.—moderate burn.
 Sl. G—slight growth.
 NG—no growth.
 GG—good growth.

It will be noted from the foregoing table that HF alkylate does not, per se, have a herbicidal effect. The foregoing statement is in no way intended to detract from the excellent properties which HF alkylates have been found to possess with respect to spreading powers and, generally, with respect to enhancement of results obtained when it is used as an adjuvant in agricultural chemicals of the nature here described.

EXAMPLE II

A series of tests was run to determine the effect of these sulfenamide and thiosulfenamide compounds on germinating seeds of various plants. The runs were made in the following manner. Six-inch half pots were partly filled with soil and six kinds of seeds were planted. A metal divider was used to assist in planting the seeds. Beans were planted first, followed by corn, radishes, rye grass, millet and cotton. The surface of the soil in the pot was then sprayed with 0.1 gram of the chemical to be tested, dissolved in 10 ml. of acetone (solution contains approximately 1.25 percent by weight of the sulfenamide or thiosulfenamide). The pot was rotated on a turntable to obtain an even distribution of the spray. Each of the pots was then given 250 ml. of water through the perforated bottom of a one gallon tin pail. Other general watering was necessary from time to time and the humidity was kept as high as possible by light watering in the pans containing the pots. After one week the condition and number of plants in each pot was recorded. No growth is designated as 0, and normal growth is designated as 3. The results of these tests are recorded below in Table II.

Table II

| Compound[1] | Beans | Corn | Radishes | Rye Grass | Millet | Cotton |
|---|---|---|---|---|---|---|
| 1 | 3 | 3 | 3 | 3 | 3 | 3 |
| 2 | 0 | 3 | 3 | 0 | 0 | 3 |
| 3 | 0 | 3 | 3 | 0 | 0 | 0 |
| 4 | 0 | 3 | 3 | 0 | 0 | 3 |
| 5 | 0 | 3 | 3 | 0 | 0 | 0 |
| 6 | 2 | 3 | 3 | 0 | 3 | 3 |

[1] See Table I for names of compounds.

In the tests described above, enough seeds of each kind were planted to insure that, when no growth was observed, this was not due to seed failure.

Reasonable variation and modification are possible within the scope of the foregoing disclosure and the appended claims to the invention, the essence of which is that certain sulfenamide and thiosulfenamide compounds, and certain preferred compounds of this group, as described, have been found effective to kill Bermuda grass and that selected compounds, also as described, have been found to be useful for said purposes even in planted areas without substantially adversely affecting germination of the planted areas.

I claim:

1. The method of killing undesirable Bermuda grass which comprises applying to said grass a herbicidal amount of a herbicidal composition of matter containing dissolved in a herbicide solvent an organic compound having the following structural characteristics

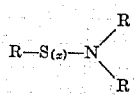

wherein $(x)$ is an integer selected from the group of 1 and 2, wherein the R's are selected from the group consisting of alkyl, aryl, alkaryl, aralkyl and cycloalkyl radicals, wherein each of the R's contain at least one and not more than 10 carbon atoms and are not necessarily identical and wherein the R's on the N together therewith can form a heterocyclic ring containing 5–6 atoms selected from the group consisting of carbon, oxygen, and nitrogen atoms, at least three atoms in the ring being carbon atoms.

2. A method according to claim 1 wherein the amount of said organic compound applied to said grass is in the range of 10 to 200 pounds per acre.

3. A method of killing Bermuda grass which comprises applying to said grass dispersed in a herbicide carrier in a concentration of from about 0.1 to about 5 percent of a compound having the following structural characteristics:

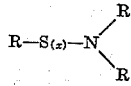

wherein $(x)$ is an integer selected from the group of 1 and 2, wherein the R's are selected from the group consisting of alkyl, aryl, alkaryl, aralkyl, and cycloalkyl radicals, wherein each of the R's contain at least one carbon and not more than 10 carbon atoms and are not necessarily identical and wherein the R's on the N together therewith can form a heterocyclic ring containing 5–6 atoms selected from the group consisting of carbon, oxygen and nitrogen atoms, at least three atoms in the ring being carbon atoms.

4. A method of killing Bermuda grass according to claim 1 wherein a small but effective herbicidal quantity of said compound is dispersed in a liquid hydrocarbon heribicidal adjuvant carrier.

5. A method of killing Bermuda grass according to claim 1 wherein a small but effective herbicidal quantity of said compound is dispersed in an isoparaffinic hydrocarbon hydrofluoric acid heavy alkylate product boiling within the range of about 260° F. to about 800° F.

6. A method of killing undesirable Bermuda grass in a place in which bean plantings are made which comprises planting bean seeds and then applying to said place in an amount effective to kill said grass a compound selected from the group consisting of N,N-diethyl-tert-butylthiosulfenamide, N,N - di - 2-ethylhexyl-tert-butylsulfenamide and tert-butylthiosulfenylmorpholine.

7. A method of killing undesirable Bermuda grass in a place in which corn plantings are made which comprises planting corn seeds and then applying to said place in an amount effective to kill said grass a compound selected from the group consisting of N,N-diethyl-tert-butylthiosulfenamide, phenylsulfenylmorpholine, tert-butylthiosulfenylpiperidine, phenylsulfenylpiperidine, N,N-di-2-ethylhexyl - tert - butylsulfenamide, and tert-butylthiosulfenylmorpholine.

8. A method of killing undesirable Bermuda grass in a place in which radish plantings are made which comprises planting radish seeds and then applying to said place in an amount effective to kill said grass a compound selected from the group consisting of N,N-diethyl-tert-butylthiosulfenamide, phenylsulfenylmorpholine, tert-butylthiosulfenylpiperidine, phenylsulfenylpiperidine N,N-di-2-ethylhexyl - tert - butylsulfenamide, and tert-butylthiosulfenylmorpholine.

9. A method of killing undesirable Bermuda grass in a place in which rye grass plantings are made which comprises planting rye grass seeds and then applying to said place in an amount effective to kill said grass, N,N-diethyl-tert-butylthiosulfenamide.

10. A method of killing undesirable Bermuda grass in a place in which millet plantings are made which comprises planting millet seeds and then applying to said place in an amount effective to kill said grass a compound selected from the group consisting of N,N-diethyl-tert-butylthiosulfenamide and tert - butylthiosulfenylmorpholine.

11. A method of killing undesirable Bermuda grass in a place in which cotton plantings are made which comprises planting cotton seeds and then applying to said place in an amount effective to kill said grass a compound selected from the group consisting of N,N-diethyl-tert-butylthiosulfenamide, phenylsulfenylpiperidine, and tert-butylthiosulfenylmorpholine.

12. A method of killing undesirable Bermuda grass in a place in which it is desired to grow a vegetable crop which comprises planting said crop and then applying to the soil in an amount effective to kill said grass, a compound having the characteristics structure:

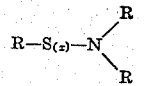

wherein $(x)$ is an integer selected from the group of 1 and 2, wherein the R's are selected from the group consisting of alkyl, aryl, alkaryl, aralkyl, and cycloalkyl radicals, wherein each of the R's contain at least one carbon and not more than 10 carbon atoms and are not necessarily identical and wherein the R's on the N together therewith can form a heterocyclic ring containing 5–6 atoms selected from the group consisting of carbon oxygen and nitrogen atoms, at least three atoms in the ring being carbon atoms, the compound selected being one which does not substantially adversely affect the growth of said crop.

13. A method of killing undesirable Bermuda grass which comprises applying to said grass, in an amount effective to accomplish said killing, phenylsulfenylmorpholine.

14. A method of killing undesirable Bermuda grass which comprises applying to said grass, in an amount effective to accomplish said killing, phenylsulfenylpiperidine.

15. A method of killing undesirable Bermuda grass which comprises applying to said grass, in an amount effective to accomplish said killing, tert-butylthiosulfenyl-piperidine.

16. A method of killing undesirable Bermuda grass which comprises applying to said grass, in an amount effective to accomplish said killing, N,N-di-2-ethylhexyl-tert-butylsulfenamide.

17. A method of killing undesirable Bermuda grass which comprises applying to said grass, in an amount effective to accomplish said killing, tert-butylthiosulfenyl-morpholine.

18. A method of killing undesirable Bermuda grass which comprises applying to said grass, in an amount effective to accomplish said killing, N N-diethyl-tert-butyl-thiosulfenamide.

19. A method of killing Bermuda grass along the borders of cultivated plots, flower beds, and the like which comprises applying to said grass dispersed in a herbicide carrier in a concentration of from about 0.1 to about 5 percent of a compound having the following structural characteristics:

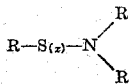

wherein ($x$) is an integer selected from the group of 1 and 2, wherein the R's are selected from the group consisting of alkyl, aryl, alkaryl, aralkyl, and cycloalkyl radicals, wherein each of the R's contain at least one carbon and not more than 10 carbon atoms and are not necessarily identical and wherein the R's on the N together therewith can form a heterocyclic ring containing 5–6 atoms selected from the group consisting of carbon, oxygen and nitrogen atoms, at least three atoms in the ring being carbon atoms.

20. A method of killing undesirable Bermuda grass which comprises applying to said grass, in an amount effective to accomplish said killing, N,N-di-methyl-isopropylthiosulfenamide.

21. A method of killing undesirable Bermuda grass which comprises applying to said grass, in an amount effective to accomplish said killing N,N-di-tert-butyl-n-hexylthiosulfenamide.

22. A method of killing undesirable Bermuda grass which comprises applying to said grass, in an amount effective to accomplish said killing, N-methyl-N-nonyl-isooctylthiosulfenamide.

23. A method of killing undesirable Bermuda grass which comprises applying to said grass, in an amount effective to accomplish said killing, N-n-pentyl-N-n-decyl-n-decylthiosulfenamide.

24. A method of killing undesirable Bermuda grass which comprises applying to said grass, in an amount effective to accomplish said killing, N-phenyl-N-cyclohexyl-[2-butylphenyl]-thiosulfenamide.

25. A method of killing undesirable Bermuda grass which comprises applying to said grass, in an amount effective to accomplish said killing, N,N-ditolyl-benzyl-thiosulfenamide.

26. A method of killing undesirable Bermuda grass which comprises applying to said grass, in an amount effective to accomplish said killing, n-decylthiosulfenyl-piperidine.

References Cited in the file of this patent

UNITED STATES PATENTS

| | | |
|---|---|---|
| 2,439,734 | Himel et al. | Apr. 13, 1948 |
| 2,474 237 | Eby | June 28, 1949 |
| 2,520,401 | Himel et al. | Aug. 29, 1950 |
| 2,704,246 | Goodhue et al. | Mar. 15, 1955 |
| 2,704,761 | D'Amico | Mar. 22, 1955 |